US009240978B2

United States Patent
Farris

(10) Patent No.: US 9,240,978 B2
(45) Date of Patent: Jan. 19, 2016

(54) COMMUNICATION SYSTEM HAVING MESSAGE ENCRYPTION

(75) Inventor: Jack Farris, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1310 days.

(21) Appl. No.: 12/347,122

(22) Filed: Dec. 31, 2008

(65) Prior Publication Data

US 2010/0169638 A1 Jul. 1, 2010

(51) Int. Cl.
*H04L 29/06* (2006.01)

(52) U.S. Cl.
CPC ........ *H04L 63/0428* (2013.01); *H04L 63/0471* (2013.01)

(58) Field of Classification Search
CPC ............ H04L 63/0471; H04L 63/0428; H04L 63/0442; H04L 2209/60; H04L 51/00; H04L 51/04; H04L 51/22; H04L 51/28; H04L 45/74; H04L 67/2814; H04L 67/303; H04L 67/42
USPC .......................................................... 713/153
See application file for complete search history.

(56) References Cited

U.S. PATENT DOCUMENTS

| 6,104,716 | A  | * | 8/2000  | Crichton et al. ............... 370/401 |
| 6,145,079 | A  | * | 11/2000 | Mitty et al. .................... 713/170 |
| 6,161,181 | A  | * | 12/2000 | Haynes et al. ................. 713/170 |
| 6,321,267 | B1 | * | 11/2001 | Donaldson ..................... 709/229 |
| 6,356,937 | B1 | * | 3/2002  | Montville et al. ............ 709/206 |
| 6,721,784 | B1 | * | 4/2004  | Leonard et al. ............... 709/206 |
| 6,732,101 | B1 | * | 5/2004  | Cook |
| 6,826,627 | B2 | * | 11/2004 | Sjollema et al. .............. 709/250 |
| 7,069,271 | B1 | * | 6/2006  | Fadel et al. .................... 705/26.7 |
| 7,162,738 | B2 | * | 1/2007  | Dickinson et al. ............... 726/14 |
| 7,174,368 | B2 | * | 2/2007  | Ross, Jr. ......................... 709/207 |
| 7,213,076 | B2 | * | 5/2007  | Bodin et al. ................... 709/232 |
| 7,240,199 | B2 | * | 7/2007  | Tomkow ............ H04L 12/5875 380/285 |
| 7,406,596 | B2 | * | 7/2008  | Tararukhina et al. ......... 713/165 |
| 7,548,952 | B2 | * | 6/2009  | Delia et al. .................... 709/206 |
| 7,590,694 | B2 | * | 9/2009  | Yu .................................. 709/206 |
| 7,954,150 | B2 | * | 5/2011  | Croft et al. ...................... 726/21 |
| 7,958,562 | B2 | * | 6/2011  | Gaucas ................. G06F 21/608 709/226 |
| 8,379,867 | B2 | * | 2/2013  | Selgas et al. .................... 380/282 |
| 2002/0004899 | A1 | * | 1/2002 | Azuma ......................... 713/152 |
| 2002/0007453 | A1 | * | 1/2002 | Nemovicher ................. 713/155 |
| 2002/0019849 | A1 | * | 2/2002 | Tuvey .................. G06Q 10/107 709/206 |
| 2002/0019851 | A1 | * | 2/2002 | Pollack ............ G06F 17/30067 709/206 |
| 2002/0023138 | A1 | * | 2/2002 | Quine .................. G06Q 10/107 709/206 |
| 2002/0053019 | A1 | * | 5/2002 | Ruttan ............... H04L 63/0428 713/152 |
| 2002/0129239 | A1 | * | 9/2002 | Clark ........................... 713/153 |

(Continued)

OTHER PUBLICATIONS

Trend Micro, 'Trend Micro™ Hosted Email Security Administrator's Guide', 2013, Trend Micro Incorporated, entire document, http://docs.trendmicro.com/all/smb/hes/vAll/en-us/hes_ag.pdf.*

(Continued)

*Primary Examiner* — Christopher Brown
*Assistant Examiner* — Ronald Baum

(57) ABSTRACT

A system includes a communication device configured to transmit a message to an unsecured server. A secured server is in communication with the communication device, and is configured to receive the message from the communication device before the message is transmitted to the unsecured server, encrypt the message, and transmit the encrypted message to the unsecured server.

21 Claims, 3 Drawing Sheets

(56) References Cited

U.S. PATENT DOCUMENTS

| | | | |
|---|---|---|---|
| 2002/0129279 A1* | 9/2002 | Spacey | 713/201 |
| 2002/0199096 A1* | 12/2002 | Wenocur et al. | 713/153 |
| 2003/0055907 A1* | 3/2003 | Stiers | 709/206 |
| 2003/0115448 A1* | 6/2003 | Bouchard | 713/153 |
| 2003/0196098 A1* | 10/2003 | Dickinson et al. | 713/188 |
| 2004/0015610 A1* | 1/2004 | Treadwell | 709/246 |
| 2004/0015726 A1* | 1/2004 | Szor | 713/201 |
| 2004/0019780 A1* | 1/2004 | Waugh et al. | 713/152 |
| 2004/0133520 A1* | 7/2004 | Callas et al. | 705/51 |
| 2004/0215472 A1* | 10/2004 | Gleckman | 705/1 |
| 2005/0071632 A1* | 3/2005 | Pauker et al. | 713/165 |
| 2005/0076221 A1* | 4/2005 | Olkin et al. | 713/176 |
| 2005/0114671 A1* | 5/2005 | Little et al. | 713/182 |
| 2005/0120230 A1* | 6/2005 | Waterson | 713/188 |
| 2005/0182937 A1* | 8/2005 | Bedi | 713/171 |
| 2006/0021020 A1* | 1/2006 | Coley et al. | 726/11 |
| 2006/0075228 A1* | 4/2006 | Black ............ H04L 63/0428 713/167 |
| 2006/0080533 A1* | 4/2006 | Bradbury ............ H04L 12/58 713/170 |
| 2006/0129629 A1* | 6/2006 | Kawashima et al. | 709/203 |
| 2006/0156017 A1* | 7/2006 | McIsaac ............ H04L 51/12 713/182 |
| 2006/0168071 A1* | 7/2006 | Sugiura | 709/206 |
| 2006/0200854 A1* | 9/2006 | Saito ............ G06F 21/33 726/2 |
| 2007/0136801 A1* | 6/2007 | Le et al. | 726/10 |
| 2007/0204341 A1* | 8/2007 | Rand et al. | 726/22 |
| 2008/0010377 A1* | 1/2008 | Nissennboim | 709/226 |
| 2008/0098237 A1* | 4/2008 | Dung et al. | 713/189 |
| 2008/0187140 A1* | 8/2008 | McGillian et al. | 380/278 |
| 2008/0320081 A1* | 12/2008 | Shriver-Blake et al. | 709/205 |
| 2009/0158035 A1* | 6/2009 | Stultz | 713/160 |
| 2009/0327719 A1* | 12/2009 | Herley ............ G06F 21/42 713/168 |
| 2010/0146059 A1* | 6/2010 | Dellafera ............ G06Q 10/107 709/206 |
| 2010/0287372 A1* | 11/2010 | Welin et al. | 713/168 |
| 2011/0019547 A1* | 1/2011 | De Lutiis et al. | 370/231 |

OTHER PUBLICATIONS

Symantec, 'Symantec™ Email Security.cloud Service Description', Jun. 2015, Symantec Corporation, entire document, https://www.symantec.com/content/en/us/about/downloads/b-email-securitycloud-2015-06-en.pdf.*

* cited by examiner

COMMUNICATION SYSTEM HAVING MESSAGE ENCRYPTION

BACKGROUND INFORMATION

Securing messages transmitted to and from communication devices such as laptop computers, servers, mobile telephones, and personal digital assistants helps ensure that sensitive information contained in the message is communicated only to an authorized party. Encryption protocols are used to protect the message with a public and/or private key. Once encrypted, only the communication devices having the corresponding keys can decrypt the message.

There are a variety of encryption processes and techniques available to protect information transmitted electronically. However, when the communication channel is via email, the existing mechanisms for encrypting email can be cumbersome and complex for ordinary, non-technically sophisticated users. Accordingly, and in particular when the email transmission will make use of networks and associated servers and systems that are not protected against interception or "sniffing" by persons not authorized to access the content of the email, there is a need for an easy to use system for converting unprotected email traffic into encrypted email traffic.

DETAILED DESCRIPTION

A communication system includes a communication device configured to transmit a message to an unsecured server. A secured server is configured to receive the message from the communication device before the message is transmitted to the unsecured server, encrypt the message, and transmit the encrypted message to the unsecured server. In one exemplary approach, the communication device is used to transmit an email message over secure network to a secure server, where it is encrypted and forwarded on to an unsecured network and unsecured server. In another exemplary approach, the secured sever monitors communications by the communication device and intercepts messages transmitted to the unsecured server so as to enable encryption of said messages before transmittal to an unsecured network and server.

Accordingly, the message is encrypted before it is transmitted to the unsecured server, which allows an authorized user of the communication device to forward encrypted messages from the secured server, e.g., a server hosting a business email account, to the unsecured server hosting, e.g., a server hosting a personal email account, without compromising the security of information stored in the message. The encrypted message may then be decrypted by the authorized user after the encrypted message has been downloaded to, for example, a communication device such as a laptop computer, mobile telephone, or personal digital assistant. The encrypted message is encrypted and decrypted independently of the unsecured server, and thus, the decrypted message is never transmitted to and/or stored on the unsecured server. The decryption may be accomplished by using a local (on the receiving device) decryption client software application or through the use of a packaged message, which includes both the message content and the logic required to perform decryption, once a key is provided.

Figure 1:
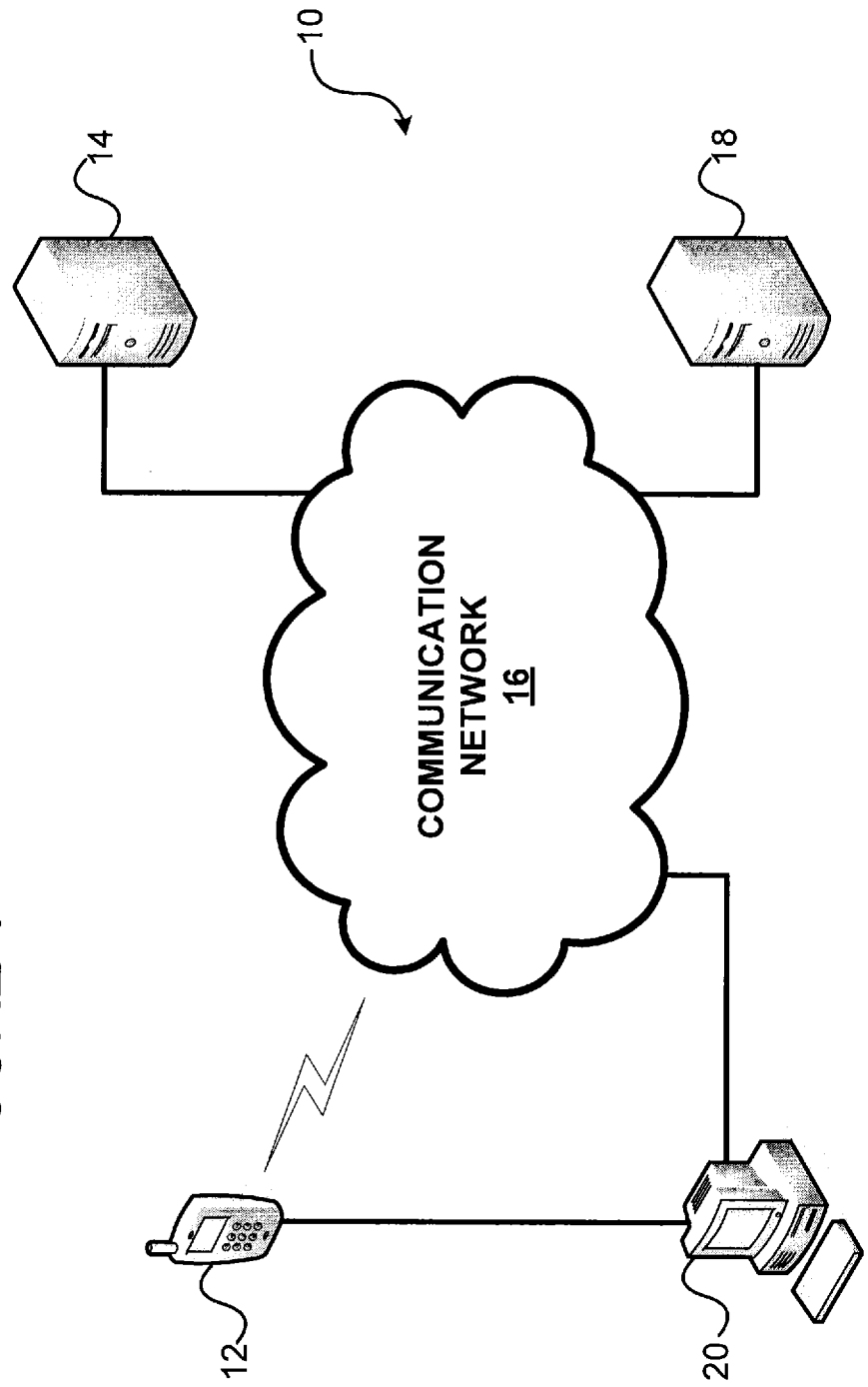
FIG. 1 is an exemplary diagram of a communication system having a communication device and a secured server configured to encrypt messages transmitted to an unsecured server.

FIG. 1 is a diagram of an exemplary communication system 10 having a communication device 12 in communication with a secured server 14. The communication device 12 may include a laptop computer, mobile telephone such as a "smart phone," a personal digital assistant, or any other device capable of communicating with the secured server 14 over a communication network 16. In one particular implementation, the communication device 12 may be any portable device capable of wired and/or wireless communication. The secured server 14 may include any computer having software and hardware configured to communicate over the communication network 16 and encrypt messages transmitted to and from the communication device 12. In particular, the secured server 14 is configured to receive messages transmitted by the communication device 12, encrypt the messages, and transmit the encrypted message to an unsecured server 18 in communication with the secured server 14 via the communication network 16. The unsecured server 18 may be any computing device configured to send and/or receive messages via the communication network 16. In one particular approach, the unsecured server 18 may host a personal email service. Messages, such as emails, transmitted directly to the unsecured server 18 from the communication device 12 are unencrypted. An authorized user may control and/or configure various operations of the secured server 14 and communication device 12 with a computing device, such as a personal computer 20. The personal computer 20 may be in either wired or wireless communication with the communication device 12, and as discussed in greater detail below, the personal computer 20 may execute account management software that allows the authorized user to program the communication device 12 and/or the secured server 14 by designating criteria so that specific messages may be received by the secured server 14 for encryption before being transmitted to the unsecured server 18. Moreover, the authorized user may download decrypted messages from the unsecured server 18 to the personal computer 20, such as by logging into a personal email account. The personal computer 20 may decrypt the encrypted message so the authorized user is able to view the decrypted message.

The secured server 14 may use any encryption protocol and/or encryption algorithm, such as advanced encryption standard (AES), triple data encryption standard (DES), symmetric key encryption, public-key encryption, hashing algorithms, secure socket layer (SSL) encryption, transport security layer (TSL) encryption, or a combination of these or other encryption protocols, to encrypt the message. The secured server 14 may further encrypt the message using public keys, private keys, digital certificates, and/or digital signatures. In one exemplary approach, the secured server 14 may be configured to encrypt the message and attach the encrypted message to a new message. The new message is transmitted to the unsecured server 18 with the encrypted message as an attachment. In this particular approach, the new message itself may not be encrypted, but the attachment is encrypted.

The authorized user may use the personal computer 20 to decrypt the encrypted message whether transmitted alone or as an attachment. For example, the secured server 14 may encrypt the message using an encryption protocol or algorithm that incorporates the authorized user's user identification and/or password, and the authorized user may use the user identification and/or password as a decryption key by entering the user identification and/or password into the personal computer 20 or communication device 12. Once entered, the receiving device decrypts the message using a decryption algorithm so that the authorized user is able to read the message. When encrypted messages are downloaded to the user's personal computer 20, for example, the personal computer 20 may recognize that the user is the authorized user based on the user identification and/or password used to log into the personal computer 20. Alternatively, the personal computer 20 may access the decryption key stored in a cookie or otherwise locally on the personal computer 20 to decrypt the message. In another illustrative approach, the secured server 14 may attach an executable file to the encrypted message or the new message. The executable could include the decryption algorithm, and may be executed by the authorized user, for example, after prompting the authorized user for the user identification and/or password. Accordingly, the encrypted message is encrypted and decrypted independently of the unsecured server 18, and thus, the decrypted message is never transmitted to and/or stored on the unsecured server 18.

In one exemplary approach, the communication device 12 may automatically redirect the message from the unsecured server 18 to the secured server 14 based on destination information stored in the message. The destination information may designate that the message be transmitted to the unsecured server 18, and may be stored in one or more fields, such as a To field or a Subject field. For example, the destination information may be in the form of an email address. The personal computer 20 may include account management software that allows the authorized user to designate any number of criteria for redirecting messages to the secured server 14. For example, the authorized user may configure the communication device 12 to automatically redirect all messages sent to and/or from a particular email address to the secured server 14 for encryption before the message is transmitted to the unsecured server 18 hosting that particular email address. Alternatively, the authorized user may designate the unsecured server 18 by placing the destination information (e.g., the email address) in the Subject field of the message, and transmitting the message directly to an email address that designates the secured server 14. In another alternative, the authorized user, using the personal computer 20, may designate that all forwarded messages be redirected to the secured server 14 for encryption before being forwarded. In yet another alternative, the user may designate that only messages that have a specific priority or importance be redirected to the secured server 14 for encryption.

In one exemplary approach, the communication device 12 may include a memory storage device that has a table of known unsecured servers 18 stored in a "blacklist," and/or a table of known secured servers stored in a "whitelist." When the message is transmitted to a personal email account on the "blacklist," such as Gmail™, Hotmail™, AOL™, Yahoo™, etc., the communication device 12 automatically redirects the message to the secured server 14. When the message is transmitted to a personal email account on the "whitelist," the communication device 12 transmits the message directly to the known secured server. Moreover, messages transmitted to unknown servers may be automatically treated as unsecured servers 18 and redirected to the secured server 14 for encryption. The known secured servers in the "whitelist" may be different than the secured server 14.

Figure 2:
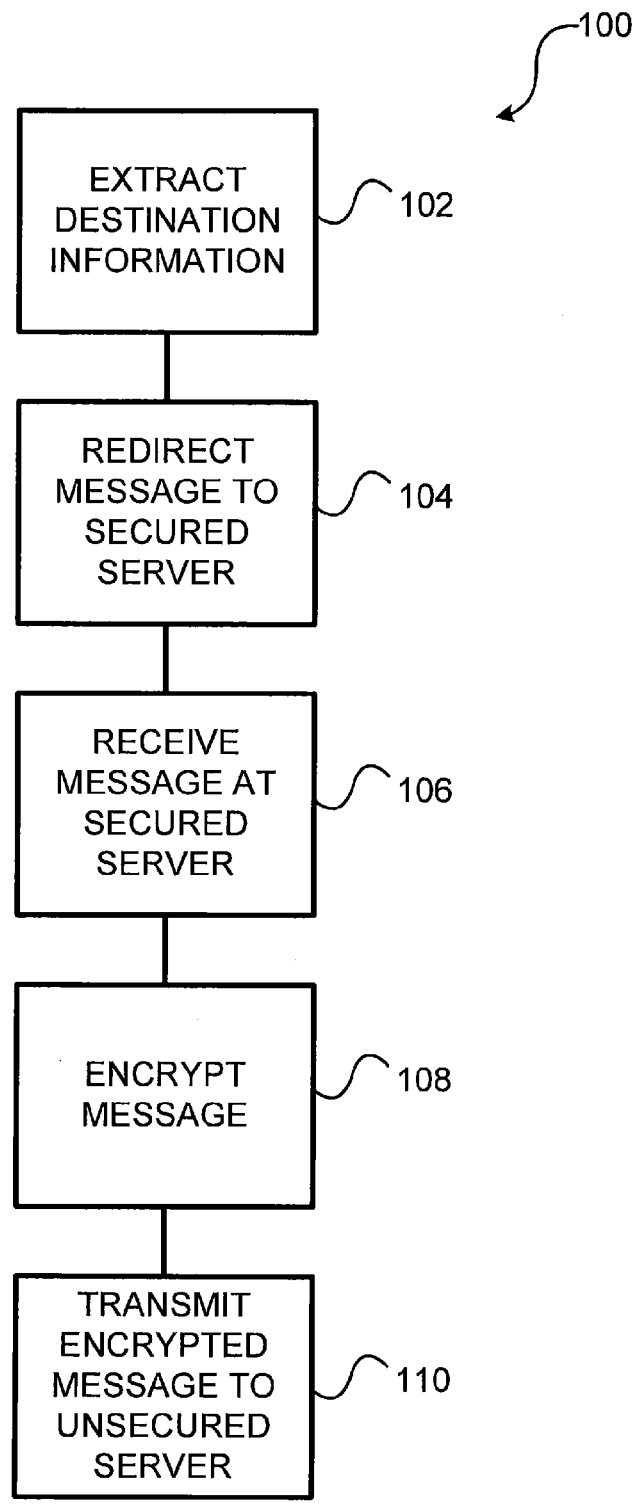
FIG. 2 is a flowchart of an exemplary method executed by the communication system of FIG. 1.

One possible exemplary implementation of the approach outlined in the preceding paragraphs is illustrated as method 100 in the flowchart of FIG. 2. The method 100 may include a step 102 of extracting destination information from one of the fields of the message transmitted from the communication device 12. As previously discussed, the destination information designates that the message is to be transmitted to and received by the unsecured server 18. If the destination information designates the unsecured server 18, the method 100 further includes a step 104 of redirecting the message from the unsecured server 18 to the secured server 14. It may be desirable to have a message sent to secured server 14 by default if the destination information is not recognizable to the system. The message is received at the secured server 14 at step 106, encrypted at step 108, and the encrypted message is transmitted from the secured server 14 to the unsecured server 18 at step 110. Although not shown, the method 100 may alternatively include steps of attaching the encrypted message to a new message, transmitting the new message to the unsecured server 18 with the encrypted message as an attachment, and/or transmitting decryption information with the encrypted message. Moreover, the encrypted message may then be downloaded by the authorized user from the unsecured server 18, and decrypted using the personal computer 20 or other computing device such as a communication device 12, as discussed above.

Instead of redirecting messages from the communication device 12 to the secured server 14 based on predetermined criteria as discussed above, referring again to FIG. 1, in an alternative exemplary approach, the secured server 14 may be configured to monitor communications from the communication device 12. In this exemplary implementation, before transmitting messages to the unsecured server 18, the communication device 12 may first notify the secured server 14 that a message is about to be transmitted. This notification may include the destination information. From the destination information, the secured server 14 can determine whether to intercept and encrypt the message. Alternatively, the communication device 12 may be configured to simply route all traffic through the secured server 14, and the secured server 14 automatically extracts the destination information from each message transmitted and determines whether the message is being transmitted to one or more unsecured servers 18. If so, the secured server 14 is configured to encrypt the message before transmission. In yet another alternative approach, the secured server 14 may be configured to intercept and automatically encrypt all messages with an email address or other destination information stored in the Subject field, or all messages transmitted by the communication device 12. In each of these alternative implementations, the secured server 14 intercepts messages transmitted to one or more unsecured servers 18 and encrypts the message before transmitting the encrypted message to the unsecured server 18. Again, the unencrypted message is never stored on the unsecured server 18, and can only be decrypted by the authorized user providing the decryption information using, for example, the personal computer 20.

In one exemplary approach, the secured server 14 may include a memory storage device that has the table of known unsecured servers 18 stored in a "blacklist," and/or a table of known secured servers stored in a "whitelist." When the message received at the secured server 14 designates a personal email account on the "blacklist," such as Gmail™, Hotmail™, AOL™, Yahoo™, etc., the secured server 14 automatically intercepts and encrypts the message before transmitting the encrypted message to the unsecured server 18. When the message is transmitted to a personal email account on the "whitelist," the secured server 14 may simply transmit the message directly to the known secured server, or negotiate an encryption protocol to encrypt the message to be decrypted by the known secured server. Messages transmitted to unknown servers may be automatically treated as unsecured servers 18 and intercepted and encrypted by the secured server 14. Again, the known secured servers in the "whitelist" may be different than the secured server 14.

Figure 3:
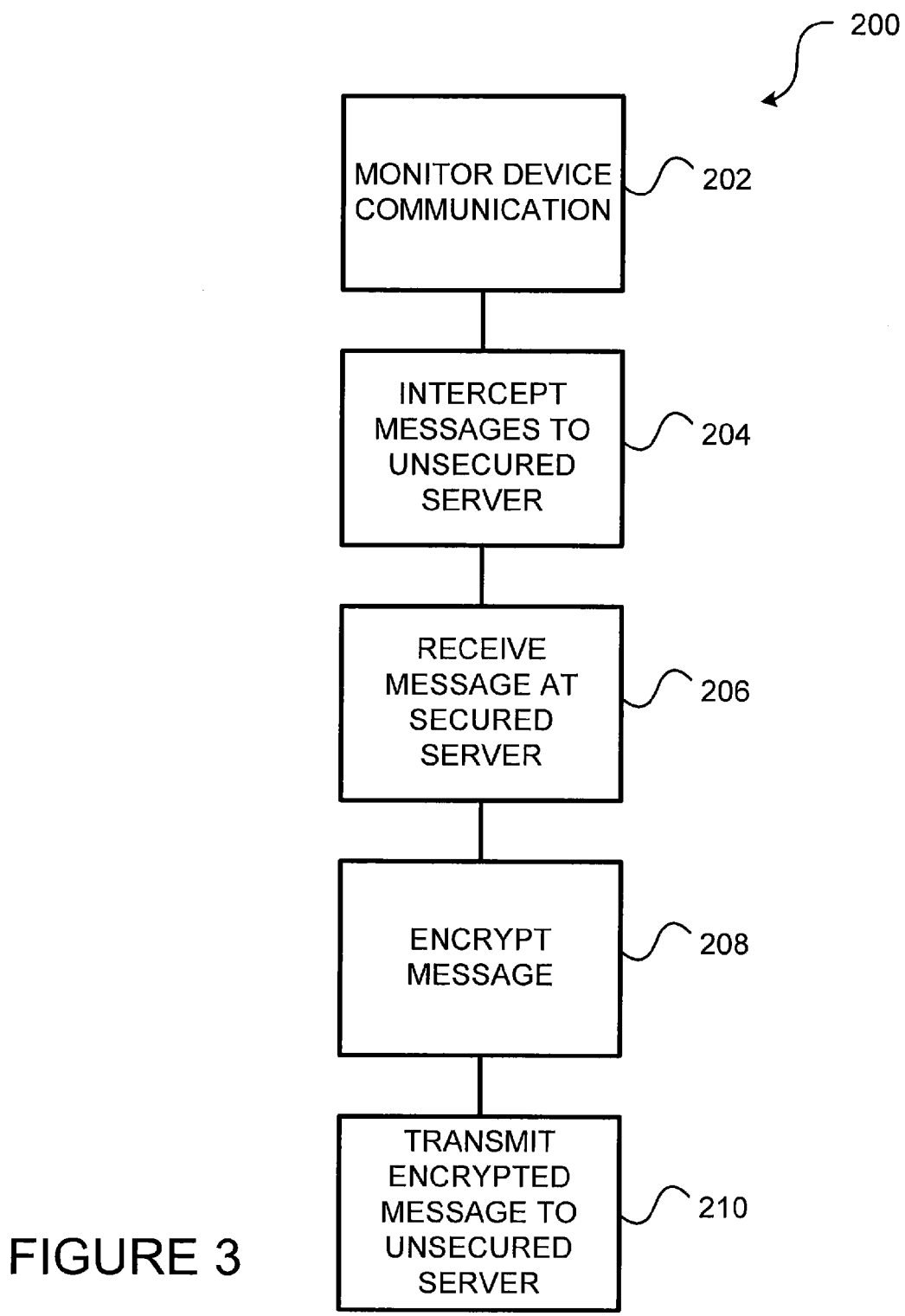
FIG. 3 is a flowchart of another exemplary method executed by the communication system of FIG. 1.

One particular implementation of the approach outlined in the preceding paragraphs is illustrated as method 200 in the flowchart of FIG. 3. The method 200 includes a step 202 of monitoring communication from the communication device 12. The step 202 of monitoring may include extracting destination information from the addressing field of the message. The method 200 may further include a step 204 of intercepting messages transmitted from the communication device 12 that designate the unsecured server 18. Once intercepted, the message is received at the secured server 14 at step 206, encrypted at step 208, and the encrypted message is transmitted to the unsecured server 18 at step 210. Although not shown, the method 200 may alternatively include steps of attaching the encrypted message to a new message, transmitting the new message to the unsecured server 18 with the encrypted message as an attachment, and/or transmitting decryption information with the encrypted message. Moreover, the encrypted message may then be downloaded by the authorized user from the unsecured server 18, and decrypted using the personal computer 20.

The components of the communication system 10, such as the communication device 12, secured server 14, unsecured server 18, and personal computer 20, may each include computing devices that generally include applications, which may be software applications tangibly embodied as a set of computer-executable instructions on a computer readable medium within the computing devices. As previously discussed, the computing devices may be any one of a number of electronic computing devices, such as a laptop or desktop computer, handheld computing device, cellular telephone, embedded microprocessor, etc. Computing devices may employ any of a number of computer operating systems, including, but not limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system.

Computing devices generally each include instructions executable by one or more devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

The communication system 10 may include a variety of hardware and/or software, including the communication device 12, the secured server 14, the unsecured server 18, and the personal computer 20. The secured server 14 and unsecured server 18 may be associated with a relational database management system from which data may be extracted. However, the communication system 10 may also represent other mechanisms for providing data, such as data stored in one or more files and obtained via file transfer protocol (FTP) or the like, data obtained from a computer-readable medium such as a disk or tape, or even manual entry of data, among other possible mechanisms. The precise number and type of computer servers included in the communication system 10 is not crucial. Further, it is not crucial that any of the information be stored in any particular data store. Thus, the communication system 10 may be configured to a variety of architectures.

A relational database management system 10 generally employs Structured Query Language (SQL) in addition to a language for creating, storing, editing, and executing stored procedures, such as the PL/SQL language mentioned above. However, it is to be understood that data stores associated with a computing device may be some other kind of database such as a hierarchical database, a set of files, and an application database in a proprietary format, etc. A data store often includes a computing device employing a computer operating system such as one of those mentioned above, and are accessed via a network in any one or more of a variety of manners, as is well known.

The method steps 100-110 and 200-210 described herein may be generally tangibly embodied as one or more sets of computer-executable instructions stored on a computer-readable medium. Such computer readable-medium may be included in or associated with one or more computing devices, even if such devices are not illustrated in the figures. The method steps accordingly generally execute within one or more such computing devices. The computer-readable medium includes any medium, including a tangible medium, which participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of tangible computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. The tangible computer-readable medium may include instructions for performing any of the steps previously recited. However, it is to be appreciated that the tangible computer-readable medium may include instructions for performing steps other than those recited. It is to be further appreciated that some of steps may be performed by the computer, whereas other steps may be performed by a person or another computer.

Transmission media may include coaxial cables, copper wire, and fiber optics, including the wires that comprise a system bus coupled to a processor. Transmission media may include or convey acoustic waves, light waves and electromagnetic emissions, such as those generated during radio frequency (RF) and infrared (IR) data communications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems 10, and should in no way be construed so as to limit the claimed invention.

Accordingly, the above description is intended to be illustrative and not restrictive. Many systems and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems 10 and methods will be incorporated into such future systems 10. In sum, it should be understood that the invention is capable of modification and variation and is limited only by the following claims.

All terms used in the claims are intended to be given their broadest reasonable constructions and their ordinary meanings unless an explicit indication to the contrary in made herein. In particular, use of the singular articles such as "a," "the," "said," etc. should be read to recite one or more of the indicated elements unless a claim recites explicitly to the contrary.

We claim:

1. A communication system comprising:
    a communication device configured to
        designate, by a user input of destination information including an email address in a subject field as part of a message and based on a priority associated with the message, whether the message is to be sent to a destination server that is unsecured,
        determine the destination server based on the email address designated in the subject field as part of the message and the priority associated with the message,
        transmit the message to the destination server based on whether the message designates that the destination server is unsecured, and
        store the destination information that indicates whether the destination server of the transmitted message is unsecured,
    a secured server, in communication with the communication device and distinct from the destination server, configured to
        receive the message from the communication device before the message is transmitted to the destination server, when such destination server is determined to be unsecured,
        encrypt the message, and
        transmit the encrypted message to the destination server, when such destination server is determined to be unsecured, for forwarding the encrypted message to a target computing device.

2. The communication system as set forth in claim 1, wherein the communication device is configured to automatically redirect the message intended for the destination server, when such destination server is determined to be unsecured, to the secured server.

3. The communication system as set forth in claim 2, wherein the communication device is configured to automatically redirect the message to the secured server based on destination information stored in the subject field.

4. The communication system as set forth in claim 3, wherein the destination information designates the destination server.

5. The communication system as set forth in claim 4, wherein-the email address designates the destination server according to predefined criteria.

6. The communication system as set forth in claim 1, wherein the secured server is configured to monitor communication sent from the communication device, determine whether the destination server of the message is the destination server, when such destination server is determined to be unsecured, and selectively intercept the message if the message designates the destination server, when such destination server is determined to be unsecured.

7. The communication system as set forth in claim 6, wherein the subject field includes at least one addressing field and wherein the secured server is configured to automatically intercept the message based on destination information stored in the addressing field.

8. The communication system as set forth in claim 1, wherein the secured server is configured to attach the encrypted message as an attachment to a new message and transmit the new message to the destination server, when such destination server is determined to be unsecured.

9. The communication system as set forth in claim 1, wherein the secure server is configured to encrypt the message in accordance with a user identification and password, and
    wherein the communication device is configured to prompt the user for the user identification and password and decrypt the encrypted message in accordance with the user identification and password received from the user.

10. The communication system as set forth in claim 9, wherein the secure server and the communication device require the same user identification and password to authorize the user.

11. The communication system as set forth in claim 1, wherein the communication device is configured to store the destination information in a first list that includes a listing of destination servers that are predetermined to be unsecured servers.

12. The communication system as set forth in claim 11, wherein the communication device is configured to store and utilize a second list to automatically redirect the message from the destination server to the secured server.

13. The communication system as set forth in claim 12, wherein the second list includes a listing of destination servers that are predetermined to be secured servers.

14. A method comprising:
    designating, by a user input of destination information including an email address in a subject field as part of a message and based on a priority associated with the message, whether the message is to be sent to a destination server that is unsecured;
    determining the destination server based on the email address designated in the subject field as part of the message and the priority associated with the message;
    storing the destination information that indicates whether the destination server of the transmitted message is unsecured;
    receiving, at a secured server that is distinct from the destination server, the message transmitted by a communication device and designating the destination server, when such destination server is determined to be unsecured;
    encrypting the message at the secured server; and
    transmitting the encrypted message to the destination server, based on whether the message designates that the destination server is unsecured, for forwarding the encrypted message to a target computing device.

15. The method as set forth in claim 14, further comprising:
monitoring communication between the communication device and the destination server, when such destination server is determined to be unsecured; and
intercepting the message if the message designates the destination server, when such destination server is determined to be unsecured.

16. The method as set forth in claim 15, wherein monitoring communication between the communication device and the destination server, when such destination server is determined to be unsecured, includes extracting destination information from the subject field of the message and determining whether the extracted destination information designates the destination server, when such destination server is determined to be unsecured.

17. The method as set forth in claim 14, further comprising automatically redirecting the message from the destination server, when such destination server is determined to be unsecured, to the secured server.

18. The method as set forth in claim 17, further comprising extracting destination information from the subject field of the message transmitted from the communication device, and determining whether the extracted destination information designates the destination server, when such destination server is determined to be unsecured.

19. The method as set forth in claim 14, further comprising:
attaching the encrypted message as an attachment to a new message; and
transmitting the new message to the destination server, when such destination server is determined to be unsecured.

20. The method as set forth in claim 14, further comprising transmitting decryption information with the encrypted message.

21. A communication device comprising:
a processor; and
a memory;
wherein the processor executes an application stored in the memory to:
designate, by a user input of destination information including an email address in a subject field as part of a message and based on a priority associated with the message, whether the message is to be sent to a destination server that is unsecured,
determine the destination server based on the email address designated in the subject field as part of the message and the priority associated with the message,
transmit the message to the destination server based on whether message designates that the destination server is unsecured, and
store the destination information that indicates whether the destination server of the transmitted message is unsecured,
such that a secured server, distinct from the destination server:
communicates with the communication device by receiving the message from the communication device before the message is transmitted to the destination server, when such destination server is determined to be unsecured, to encrypt the message, and
transmits the encrypted message to the destination server, when such destination server is determined to be unsecured, and
forwards the encrypted message to a target computing device.

\* \* \* \* \*